(12) United States Patent
Ling et al.

(10) Patent No.: US 9,998,533 B2
(45) Date of Patent: Jun. 12, 2018

(54) P2P CONTENT CACHING SYSTEM AND METHOD

(75) Inventors: Jin Ling, Beijing (CN); Hui Ling, Beijing (CN); Liang Lu, Beijing (CN); Yi Xin Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1076 days.

(21) Appl. No.: 12/788,636

(22) Filed: May 27, 2010

(65) Prior Publication Data

US 2010/0306339 A1    Dec. 2, 2010

(30) Foreign Application Priority Data

May 31, 2009 (CN) .......................... 2009 1 0142711

(51) Int. Cl.
*H04L 29/08* (2006.01)

(52) U.S. Cl.
CPC ........ *H04L 67/104* (2013.01); *H04L 67/1063* (2013.01); *H04L 67/2842* (2013.01)

(58) Field of Classification Search
CPC .............. H04L 67/104; H04L 67/1063; H04L 67/2842
USPC ........................................................ 709/213
See application file for complete search history.

(56) References Cited

U.S. PATENT DOCUMENTS

| | | | |
|---|---|---|---|
| 6,061,055 A * | 5/2000 | Marks | 382/276 |
| 8,028,019 B2 * | 9/2011 | Thompson | 709/203 |
| 2002/0143798 A1 * | 10/2002 | Lisiecki | G06F 17/3089 |
| 2002/0162109 A1 | 10/2002 | Shteyn | |
| 2003/0101267 A1 * | 5/2003 | Thompson et al. | 709/227 |
| 2003/0174648 A1 | 9/2003 | Wang et al. | |
| 2004/0148344 A1 | 7/2004 | Navar et al. | |
| 2006/0165014 A1 * | 7/2006 | Ikeda | 370/254 |
| 2006/0265280 A1 * | 11/2006 | Nakada | G06Q 30/02 705/14.51 |
| 2007/0121612 A1 | 5/2007 | Nadeau et al. | |
| 2008/0052368 A1 * | 2/2008 | Rahkonen | H04M 1/72563 709/212 |
| 2008/0222106 A1 * | 9/2008 | Rao | G06F 17/30696 |

(Continued)

FOREIGN PATENT DOCUMENTS

| | | |
|---|---|---|
| CN | 1937554 | 3/2007 |
| CN | 101072166 | 11/2007 |

(Continued)

*Primary Examiner* — Kevin Bates
*Assistant Examiner* — Chen-Liang Huang
(74) *Attorney, Agent, or Firm* — Fleit Gibbons Gutman Bongini Bianco PL; Thomas S. Grzesik

(57) ABSTRACT

A P2P content caching system, method, and computer program product for a P2P application on a computer network device. The system includes: a content analyzer; and a content manager. The method includes: determining P2P hotspot downloading contents of the P2P application on the computer network device; downloading the determined P2P hotspot downloading contents into a local memory, and requesting a directory server of the P2P application to register a P2P content caching system as a P2P content provider of the downloaded P2P hotspot downloading contents; and providing the downloaded P2P hotspot downloading contents to a P2P participant in response to a request from the P2P participant to the downloaded P2P hotspot downloading contents.

18 Claims, 4 Drawing Sheets

(56) References Cited

U.S. PATENT DOCUMENTS

| | | | |
|---|---|---|---|
| 2008/0276091 A1* | 11/2008 | Welin | H04L 67/104 713/170 |
| 2009/0055471 A1* | 2/2009 | Kozat et al. | 709/203 |
| 2009/0055506 A1* | 2/2009 | Hudson | D01D 5/423 709/208 |
| 2009/0106393 A1* | 4/2009 | Parr | H04L 63/0428 709/218 |
| 2009/0210489 A1* | 8/2009 | Deb et al. | 709/204 |
| 2010/0153802 A1* | 6/2010 | Van der Merwe | H04L 12/1868 714/748 |
| 2010/0185753 A1* | 7/2010 | Liu et al. | 709/219 |
| 2010/0306252 A1* | 12/2010 | Jarvis | G06F 17/30132 707/770 |
| 2011/0047215 A1* | 2/2011 | Guo et al. | 709/204 |
| 2011/0071841 A1* | 3/2011 | Fomenko et al. | 705/1.1 |
| 2011/0179328 A1* | 7/2011 | Souza et al. | 714/748 |
| 2011/0238828 A1* | 9/2011 | Grigsby et al. | 709/224 |
| 2012/0150588 A1* | 6/2012 | Niedermeyer | G06Q 30/02 705/7.35 |
| 2017/0126770 A1* | 5/2017 | Kindig | H04L 65/607 |

FOREIGN PATENT DOCUMENTS

| | | |
|---|---|---|
| CN | 101267531 | 9/2008 |
| CN | 101345690 | 1/2009 |

\* cited by examiner

P2P CONTENT CACHING SYSTEM AND METHOD

CROSS-REFERENCE TO RELATED APPLICATIONS

This application claims priority under 35 U.S.C. § 119 to Chinese Patent Application No. 200910142711.1 filed May 31, 2009, the entire contents of which are incorporated by reference herein.

BACKGROUND OF THE INVENTION

1. Field of the Invention

The present invention relates to a computer network and more particularly, to reducing loads produced on the computer network during downloading contents in Peer to Peer (P2P) transfer applications.

2. Description of the Related Art

P2P (Peer to Peer) is a kind of computer network application which allows P2P users (also referred to as "P2P participants" and "P2P clients") in a distributed environment to efficiently and reliably obtain shared contents provided by a content provider, e.g. music, MP3 files, movies and software (hereinafter referred to as "shared files", "shared contents" and "P2P contents"). According to the transfer mode of P2P, P2P clients can obtain shared contents not only from a content provider server but also from other P2P clients.

With the rapid popularization of all kinds of P2P application software, there are a wide variety of P2P shared contents in the Internet. However, frequent transfer of P2P contents, especially the traffic of content transfer between P2P clients, brings about a heavy load on the computer network.

FIG. 1 is a schematic diagram showing a computer networking environment. The computer network 100 shown in FIG. 1 includes a backbone network 110, clients 121a-1, 121a-2 . . . , and clients 121b-1, 121b-2 . . . .

A content server 101, a directory server 102 and a seed server 103 can also be implemented in P2P applications in the network 100. Those skilled in the art should appreciate that, in the P2P application field, the content server is a server where the shared contents are provided. The directory server is a server provided for (i) P2P user registration, in which a list of P2P participants who possess the shared contents is stored, (ii) the list listing names of the shared contents and information on the P2P participants, e.g. names of the shared files, (iii) information on identifications and (iv) addresses of the P2P participants. The seed server is a server for providing seed files to be downloaded by the P2P users, where the seed file contains index information on the directory server of the shared contents.

When a user of the client 121a-1 downloads the shared contents, the user downloads a corresponding seed file first. The user then sends a P2P content request for example by clicking a link to a seed file with a suffix that represents a seed file on a user browser. The P2P content request is routed to the seed server 103. In response, the seed server 103 sends to the client 121a-1 a seed file corresponding to the content requested. The client 121a-1 receives and downloads the seed file. The client 121a-1 obtains information on the P2P participant from a relevant directory server 102 according to the index information in the seed file, to thereby determine the provider of the shared contents. Then, the client 121a-1 downloads the shared contents form the provider of the shared contents (it can be the content server 101 or the P2P participant that has downloaded the shared contents and registered with directory server), and registers with the directory server 102 to be a P2P participant of the downloaded shared contents, i.e. a provider of the shared contents.

When the client 121a-2 downloads the shared contents, the shared contents are downloaded in a manner that is substantially the same as the client 121a-1 as described above. The client 121a-2 sends a P2P content request and downloads a seed file from the seed server 103, obtains information on the provider of the shared contents from the directory server 102 according to the index information in the seed file, then downloads the shared contents from a shared content provider, and registers with the relevant directory server 102 to be a P2P participant of the downloaded shared contents, i.e. a provider of the shared contents.

According to the operating manner of the P2P applications, if the shared contents to be downloaded by the client 121a-2 are the same as the shared contents download by the client 121a-1, index information in the seed file obtained by the client 121a-2 directs to a directory server which may indicate that either the content server 101 or the client 121a-1 could be the provider of the shared contents, so the client 121a-2 may download the shared contents from either the content server 101 or the client 121a-1.

P2P application software can allow the shared content requester to download the shared contents from different content providers according to the information of the shared content providers recorded in the directory server 102, for example performance parameters such as speed and bandwidth. Accordingly, the P2P participant can provide the directory server with its performance information while registering with the directory server.

It can be seen from the above description of the P2P content downloading that, when the client (e.g. client 121a-1) downloads the shared contents, in addition to communicating with the directory server 102 and the seed server 103, it also communicates with the content server 101 and other P2P participants (e.g. client 121a-2) in order to download the shard contents directly. As compared with the communication with the directory server 102 and the seed server 103, the traffic (P2P contents) of the communication with the content server 101 or other P2P participants need to occupy more bandwidth. If the communication with the content server 101 or other P2P participants is long distance, a considerable traffic will be brought about to the backbone network of the computer network. A serious load will be brought to the backbone network when numerous clients download the shared contents simultaneously.

SUMMARY OF THE INVENTION

According to one aspect of the present invention, a P2P content caching system for a P2P application on a computer network device includes: a content analyzer configured to determine P2P hotspot downloading contents of the P2P application on the computer network device; and a content manager configured to download the determined P2P hotspot downloading contents into a local memory, to request a directory server of the P2P application to register the P2P content caching system as a P2P content provider of the downloaded P2P hotspot downloading contents, and to provide the downloaded P2P hotspot downloading contents to a P2P participant in response to a request from the P2P participant to the downloaded P2P hotspot downloading contents.

According to another aspect of the present invention, a computer-implemented P2P content caching method for a P2P application on a computer network device, including: determining P2P hotspot downloading contents of the P2P application on the computer network device; downloading the determined P2P hotspot downloading contents into a local memory, and requesting a directory server of the P2P application to register a P2P content caching system as a P2P content provider of the downloaded P2P hotspot downloading contents; and providing the downloaded P2P hotspot downloading contents to a P2P participant in response to a request from the P2P participant to the downloaded P2P hotspot downloading contents.

According to yet another aspect of the present invention, a computer program product is provided for a P2P application on a computer network device. The program product includes computer program instructions stored on a computer readable storage medium. When the instructions are executed, a computer will perform the steps of the method.

Applications of the present invention can notably reduce the traffic produced on the whole backbone network by P2P content transfer between the P2P participants, to thereby reduce the load of the backbone network.

BRIEF DESCRIPTION OF THE DRAWINGS

The features and advantages of the present invention will be more comprehensible with reference to the following description of the embodiments of the invention in combination with the accompanying drawings in which the same or corresponding elements are represented by the same or corresponding reference signs.

DETAILED DESCRIPTION OF PREFERRED EMBODIMENTS

The exemplary embodiments of the present invention are described below in combination with the accompanying drawings. For the purpose of clarity and conciseness, only structures and/or methods steps closely related to the solutions of the embodiments of the present invention are shown in the accompanying drawings and the following description, and details slightly related to the present invention as well as details depending on actual implementations are omitted.

Figure 1:
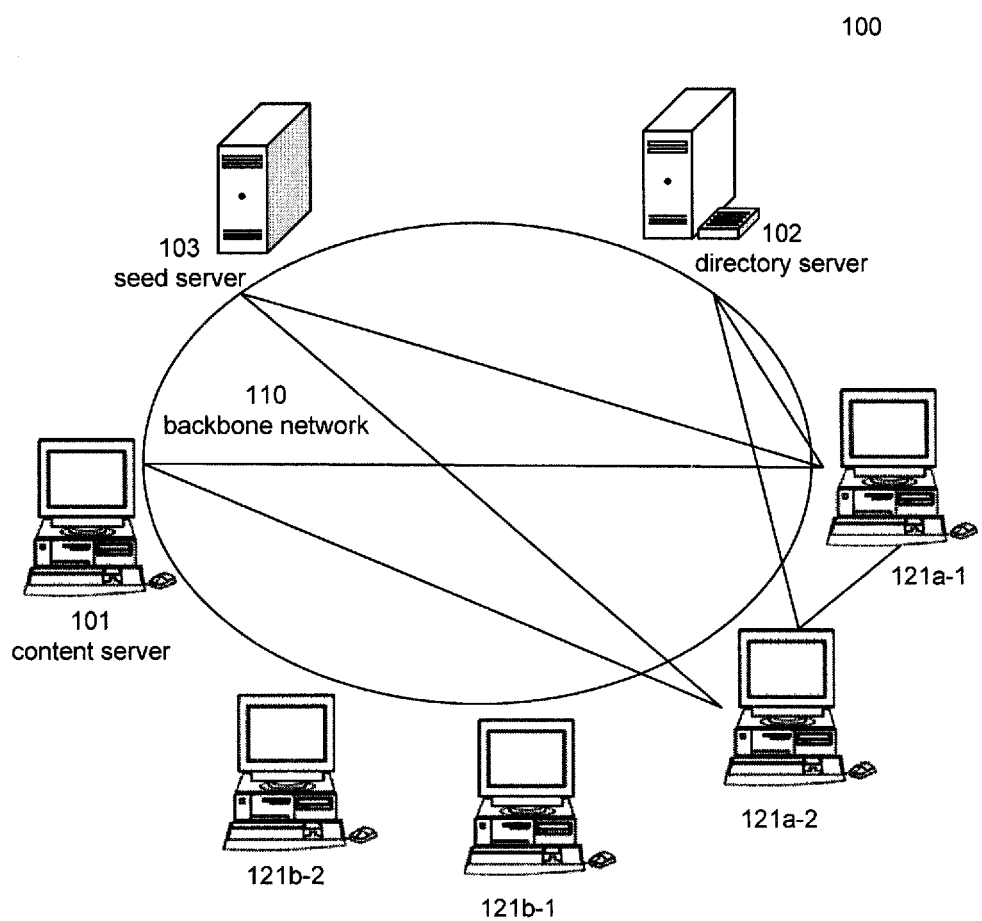
FIG. 1 is a schematic diagram showing a computer networking environment.
Figure 2:
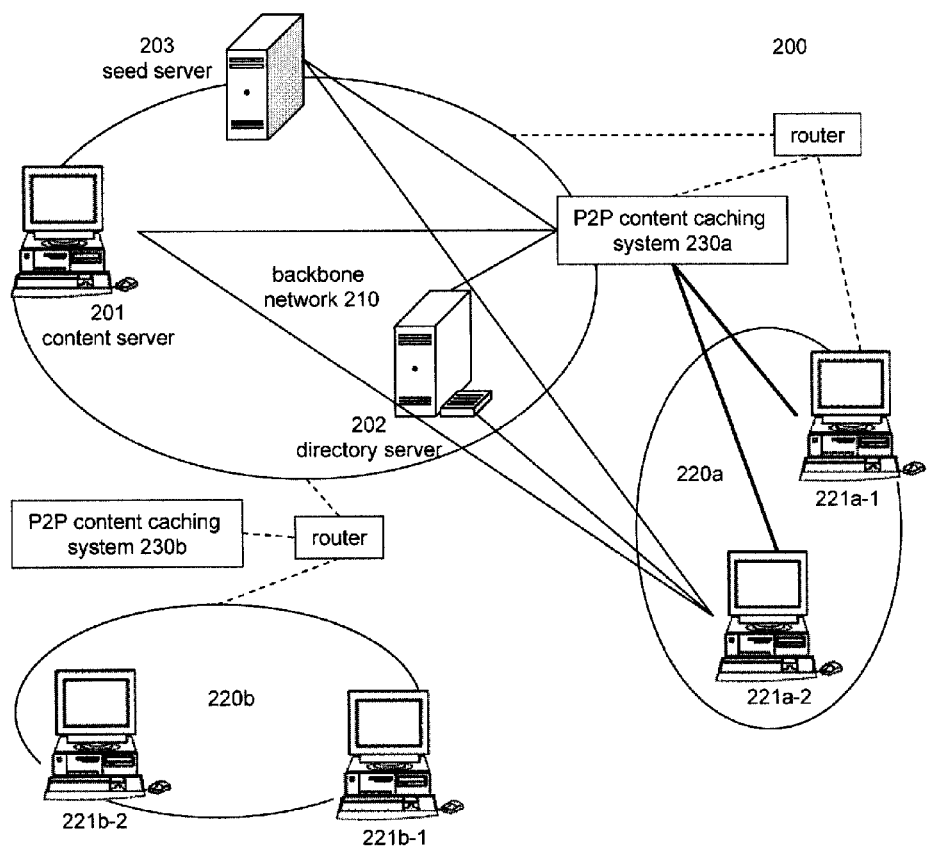
FIG. 2 is a schematic diagram showing that embodiments of the present invention are carried out in the environment shown in FIG. 1.

In order to reduce loads brought to the network by P2P downloading, embodiments of the present invention proposes deploying the P2P content caching systems of the invention over the computer network shown in FIG. 1. FIG. 2 is a schematic diagram showing that how the embodiments of the present invention can be carried out in the operating environment shown in FIG. 1. The computer network 200 shown in FIG. 2 includes a backbone network 210, area networks 220a, 220b, . . . , clients 221a-1, 221a-2 within the area network 220a, and clients 221b-1, 221b-2 within the area network 220b. There are also a content server 201, a directory server 202 and a seed server 203 deployed in the network 200, functions thereof being the same as those in FIG. 1.

In addition, the network 200 is also deployed with the P2P content caching systems of the embodiments of the present invention, for example, P2P content caching systems 230a and 230b shown in FIG. 2. Assuming that an area network (e.g. LAN) 220a and an area network 220b exists here, then it would be better for the P2P content caching system 230a to be deployed between the backbone network 210 and the area network 220a, for example, being connected directly to the area network 220a, or even being a part of the area network 220a. Similarly, the P2P content caching system 230b is deployed between the backbone network 210 and the area network 220b.

After deploying the P2P content caching systems, the P2P clients in the area network can download more P2P contents needed from a P2P content caching system located adjacently thereto, to thereby significantly reduce the traffic on the backbone network.

For a more descriptive explanation of the effect of the P2P content caching system of the invention in a P2P application, various embodiments of the P2P content caching system are described in detail below in combination with FIG. 3.

Figure 3:
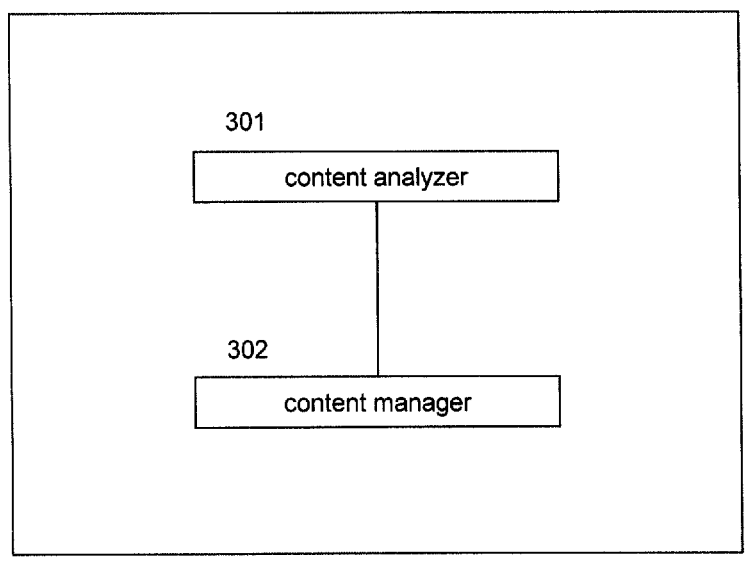
FIG. 3 is a exemplary block diagram showing a P2P content caching system of the embodiments as showed in FIG. 2.

FIG. 3 shows an exemplary block diagram of a P2P content caching system according to the embodiments of the present invention shown in FIG. 2. As shown in FIG. 3, the P2P content caching system 300 for the P2P application includes a content analyzer 301 and a content manager 302.

The content analyzer 301 is used for determining P2P hotspot downloading contents. The P2P hotspot downloading contents refer to P2P contents that are downloaded frequently by network users through P2P application software during a period of time. P2P hotspot downloading contents may be determined using various ways.

According to an embodiment of the present invention, the content analyzer 301 is configured to be capable of determining the P2P hotspot downloading contents in accordance with a P2P content request from a P2P user.

The content analyzer 301 receives from a router, a P2P content request issued by a client in the area network. Specifically, when a client issues the P2P content request in the form of HTTP, the request is a request for a seed file, and the router identifies that it is a HTTP request for a seed file by detecting that the HTTP request contains a suffix that represents a seed file, so a P2P content request is identified. According to a predetermined protocol, the router routes the P2P content request not only to the seed server but also to the content analyzer 301 connected thereto.

One way of determining the P2P hotspot downloading contents according to the P2P content request from the P2P user is analyzing the seed file involved in the P2P content request, and determining the P2P hotspot downloading contents according to the number of times the P2P shared content in the seed file is requested in a certain period of time. Because the seed file contains the names of the P2P contents, which contents are in greater demand can be determined as long as we count the P2P contents involved in each request of the client. For example, the contents with much more counts in a certain period of time can be regarded as contents in great demand.

The content analyzer 301 can be configured to determine the P2P hotspot downloading contents by analyzing a log file of the seed server. As described above, when the P2P user needs to download the shared contents, the user should first download a seed file corresponding to the requested contents. The seed file is sent by a seed server. The log file in the seed server records histories of different users' requests to the seed file, namely, histories of the downloading of various contents. The content analyzer 301 can access a manageable seed server, read its log file, and for example, count the P2P contents involved in each request for the seed file, so as to determine which contents are relatively in great demand.

In order to determine the P2P hotspot downloading contents, the analysis of the log file of the seed server can be performed according to time, that is, analyzing which contents are contents in great demand during a period of time. In general, contents in great demand during a period of time, recorded by the seed server can be contents of interest of the users in the area where the P2P content caching system is located.

By additionally analyzing user information such as user address in the log file, the content analyzer can determine that the contents in great demand during a period of time are also the contents in great demand downloaded by the user in the area where the P2P content caching system is located, and to thereby determine contents of interest of the users in the area where the P2P content caching system is located.

The function of the content manager 302 is mainly downloading the P2P hotspot downloading contents determined by the content analyzer 301 into a local memory. The local memory may be a special memory in the P2P content caching system, or another available memory connected to the P2P content caching system. The local memory generally has a far greater capacity than a client memory used by an ordinary user and may use a storage management system for accelerating the access speed.

The content manager 302 is also configured to, after downloading the P2P hotspot downloading contents into the local memory, request on the directory server to register the P2P content caching system 330 to be a P2P participant or peer for providing the downloaded contents, to thereby provide the downloaded P2P hotspot downloading contents to the P2P participants in response to the request of the P2P participant to the downloaded P2P hotspot downloading contents.

The content manager 302, upon registration, sets the P2P content caching system 330 as a high performance (e.g. fast speed and high bandwidth) P2P content provider. In general, while registering with the directory server, the P2P participant provides to the directory server its performance information (e.g. speed and bandwidth) in addition to information such as user ID and shared contents. As compared with an ordinary client, the P2P content caching system 330 has greater memory capacity, faster uploading and downloading speeds and higher bandwidth, so the P2P content caching system 330 can register itself to be a high performance P2P content provider while registering with the directory server.

The content manager is further configured to delete P2P hotspot downloading contents that are with less demand in the local memory. Here, the "demand" of the P2P hotspot downloading content refers to a measurement of a degree of the demand of the P2P hotspot downloading content. The content manager may rank the demands of the analyzed P2P hotspot downloading contents to assign a demand value to each P2P hotspot downloading content that has been analyzed. As described above, the degree of the demands of the P2P hotspot downloading contents may be only directed at a period of time, or directed at both a period of time and a local user. Accordingly, the demands of the P2P hotspot downloading contents may be ranked during a period of time, or the demands of the P2P hotspot downloading contents may be ranked by taking both the time of period and the local demands into consideration. The content manager can randomly or periodically perform the deletion, and update the registration information in time with the registration server.

The content manager can perform such deletion under a certain condition. For example, the content manager can delete the P2P hotspot downloading contents that are with less demand in the local memory in response to when an available capacity of the local memory exceeds a predetermined threshold, and update the registration information with the registration server.

As another example, the content manager can delete the P2P hotspot downloading contents with less demand in the local memory, in response to when an available capacity of the local memory is less than the size of a P2P hotspot contents to be downloaded and the demand of the P2P hotspot contents to be downloaded is higher than a least demand of the P2P hotspot downloading contents in the local memory, and update the registration information with the registration server.

According to another embodiment of the present invention, a P2P content caching method is provided for P2P applications on the network. The embodiments of the method are described below in combination with FIG. 4.

Figure 4:
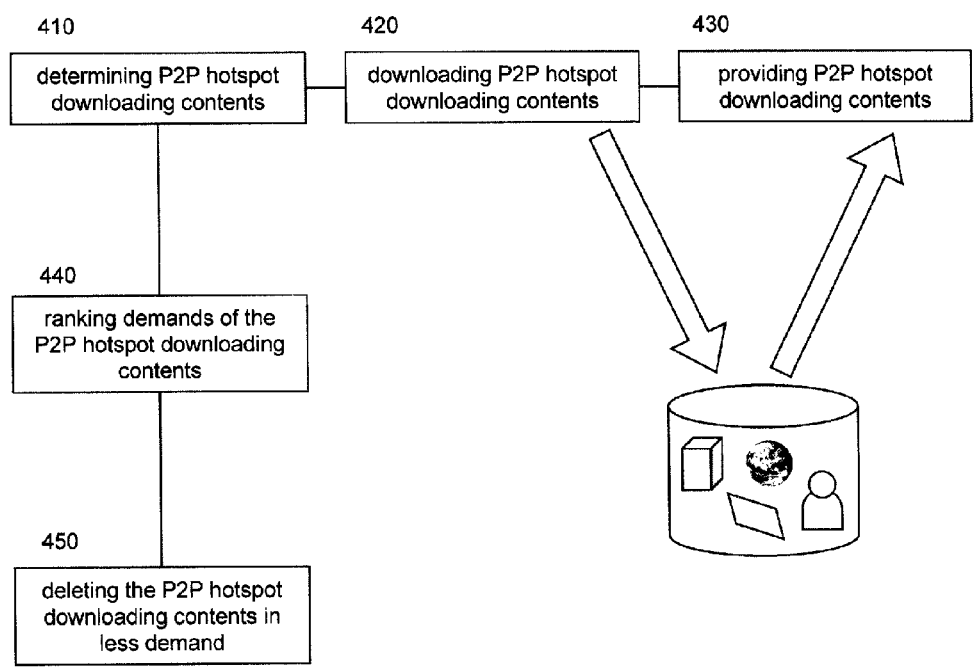
FIG. 4 shows an illustrative flow chart of a P2P content caching method according to the embodiments of the invention.

FIG. 4 shows a flow chart of the P2P content caching method according to the embodiment. As shown in the figure, the P2P content caching method for P2P application on the computer network in general includes the following steps: determining P2P hotspot downloading contents of a P2P application on the computer network (410); downloading the determined P2P hotspot downloading contents into the local memory, and requesting a directory server of the P2P application to register the P2P content caching system as a P2P content provider of the downloaded P2P hotspot downloading contents (420); and providing the downloaded P2P hotspot downloading contents to a P2P participant in response to the request of the P2P participant of the P2P application to the downloaded P2P hotspot downloading contents (430).

There can be different ways for determining the P2P hotspot downloading contents of the P2P application on the computer network (410). One way is that, the P2P content caching system 330 receives from a connected router a P2P content request issued by a client in the area network and determines the P2P hotspot downloading contents according to the P2P content request. For example, the P2P content caching system 330 can analyze a seed file involved in the P2P content request and determine the P2P hotspot downloading contents according to the number of times the P2P shared contents in the seed file are requested during a period of time.

In place of or in addition to the above, the P2P content caching system 330 can access a manageable seed server, analyze the log file in the seed server, and determine the P2P hotspot downloading contents according to the number of times the P2P shared contents are downloaded during a period of time.

Furthermore, the P2P content caching system 330 can rank the demands of the P2P hotspot downloading contents (440), to utilize the P2P hotspot downloading contents more efficiently.

For example, as described above in combination with FIG. 3, in the case of analyzing the P2P content request to determine the P2P hotspot downloading contents, the P2P content caching system 330 can rank the demands of the P2P hotspot downloading contents according to the number of times the P2P hotspot downloading contents are requested during a period of time. Further, for example, in the step of analyzing the log file in the seed server to determine the P2P hotspot downloading contents, the P2P content caching system 330 can rank the demands of the P2P hotspot downloading contents according to the number of times the P2P hotspot downloading contents are downloaded during a period of time.

Furthermore, the content caching system 330 can manage the contents in the local memory at any time or periodically according to the actual use of the local memory, for example, adding, deleting or replacing the contents in the local memory. For example, the content caching system 330 can set a threshold value for the available capacity of the local memory, and delete the P2P hotspot downloading contents with less demand in the local memory when the actual available capacity exceeds the threshold value (450).

For example, in the case that the demands of the P2P hotspot downloading contents are ranked as described above, the content caching system 330 can, in response to when an available capacity of the local memory exceeds a predetermined threshold, delete the P2P hotspot downloading contents that are with less demand in the local memory, and update the registration information with the registration server; Or, the content caching system can, in response to when an available capacity of the local memory is less than the size of the P2P hotspot contents to be downloaded and the demand of the P2P hotspot contents to be downloaded is higher than a least demand of the P2P hotspot downloading contents in the local memory, delete the P2P hotspot downloading contents with less demand in the local memory, and update the registration information with the registration server.

In the case when the content caching system 330 requests the directory server of the P2P application to register the P2P content caching system to be a P2P content provider of the downloaded P2P hotspot downloading contents (420), it registers itself as a high performance P2P content provider or P2P participant. Thus, when other P2P participants request the P2P hotspot downloading contents, the P2P application software can preferably select the content caching system 330 as the P2P content provider.

The following describes the process that the P2P content caching system provides the downloaded P2P hotspot downloading contents to the P2P participant (430). With reference to FIG. 2, when for example the user of the client 221*a*-2 in FIG. 2 needs to download a shared content, the client 221*a*-2 downloads a seed file from the seed server 203, and obtains information on the provider of the shared content from the directory server 202 according to index information in the seed file; If the shared content is the same as the P2P hotspot downloading content that has been downloaded by the P2P content caching system 330, the directory server has marked the P2P content caching system 330 as the provider of the shared content; Then the client 221*a*-2 can directly download the shared content to the P2P content caching system 330; Accordingly, the P2P content caching system 330, as a P2P participant, provides the requested shared content to the client 221*a*-2.

Finally, the process of downloading the P2P contents after the P2P content caching system of the invention is deployed on the computer network is described in combination with FIG. 2.

When the user of the client 221*a*-1 needs to download a shared content "A", the user should first download a seed file. The user issues a P2P content request by clicking on a link representing P2P downloading on the browser.

On the one hand, the P2P content request is routed to the seed server 203 which transmits a corresponding seed file to the client 221*a*-1. The client 221*a*-1 obtains information on the P2P participants who possess the requested content from the relevant directory server 202, according to the index information in the seed file, to thereby determine the provider of the shared content. Then, the client 221*a*-1 downloads the shared content "A" from the P2P participant and registers with the directory server 202 to be a P2P content provider of the downloaded shared content.

On the other hand, since the P2P content request is identified by the router as a P2P content request, the P2P content request is routed to the P2P content caching system 230*a* according to a predetermined protocol. According to the method described above in combination with FIG. 4, the P2P content caching system 230*a* analyzes if the content involved in the P2P content request is the P2P hotspot downloading content according to the P2P content request and previously received other P2P content requests, and processes accordingly. For instance, assuming that the content "A" is determined by the P2P content caching system 230*a* as the P2P hotspot downloading content, according to the method described above in combination with FIG. 4, the P2P content caching system 230*a* also downloads the content "A" into the local memory, and registers with the registration server 202 as a content provider of the content "A", e.g. as a high performance content provider of the content "A".

In addition, assuming that the client 221*a*-2 also downloads the shared content "A", in this case, the client 221*a*-2 operates in a manner that is substantially the same as the client 221*a*-1, that is, downloading the seed file from the seed server 203 and obtaining information on the provider of the shared content from the directory server 202 according to the seed file. Since the P2P content caching system 230*a* becomes the provider of the content "A", and it has higher performance than other providers of the content "A" and is located in the area where the client 221*a*-2 is located, the P2P content caching system 230*a* is preferred as the provider of the content "A". So, the client 221*a*-2 directly downloads the shared content "A" from the P2P content caching system 230*a*.

Those skilled in the art know that, according to the operating modes of the P2P application, in the above example, the shard content "A" to be downloaded by the client 221*a*-2 is the same as the shared content downloaded by the client 221*a*-1, and is the same as the content downloaded by the P2P content caching system 230*a* as the hotspot downloading content, and the directory server 202 can indicate all of the content server 201, the client 221*a*-1 and the P2P content caching system 230*a* as the provider of the shared content "A". However, in deploying the embodiments of the invention, the P2P content caching system 230*a* will be preferably selected to provide the content "A" to the client 221*a*-1. As compared with the content server 201, the P2P content caching system 230*a* is closer, and the traffic of the content "A" does not need to pass through the backbone network, so the load of the backbone network is reduced.

As compared with the client 221*a*-1, the P2P content caching system has a higher performance, e.g. faster speed, and can accommodate more P2P applications and more downloaded contents, so it has a higher downloading efficiency. In some cases, e.g. in case that the client 221*a*-1 (and other P2P participants possessing the content "A" in the area) is unavailable or inactive, e.g. in case of off-line, the client 221*a*-2 can directly download the content "A" from the P2P content caching system 230*a* without the need to download the content "A" from the content server 201 or from other remote P2P participants. The computer network applying the P2P content caching system 230a of the invention can reduce loads produced during downloading P2P contents on the backbone network. In the case when there are a lot of P2P contents to be downloaded on the computer network, the effect is particularly notable. Costs caused by upgrading the network infrastructures in order to relieve the loads of the backbone network can be reduced or eliminated by deploying the system of the invention.

The above explains in detail, the embodiments and advantages of the present invention. However, it should be appreciated that, those skilled in the art can make various variations, substitutions and changes to the technical solutions of the present invention, without departing from the spirit and scope of the present invention as defined by the claims. For example, although the description uses an example to describe the embodiments of the present invention, the present invention is also applied to other P2P applications. Furthermore, although the description provides an embodiment in which the P2P content caching system of the present invention receives a P2P content request issued by the P2P user from a router in an area network, the P2P content caching system of the present invention can also be integrated in a router or gateway in the area network. Furthermore, although the local area network is discussed as an example of the area network, the technical solutions of the invention are not limited to the use of a local area network. A megalopolis area network, a wide area network or a combination thereof can also be applied. Therefore, the invention shall be delimited by the technical solutions of the claims and embraces various variations, substitutions and changes to the technical solutions of the claims.

What is claimed is:

1. A Peer-to-Peer (P2P) content caching information processing system for a P2P application on a computer network device, the information processing system comprising:
    a processor;
    a memory communicatively coupled to the processor;
    a content analyzer to
        receive, from at least one router of an area network of the computer network device, a plurality of P2P content requests issued by a plurality of P2P participants, wherein the plurality of P2P content requests is received prior to caching of P2P content associated with the plurality of P2P content requests by the content analyzer, wherein each P2P content request in the plurality of P2P content requests is also received by a seed server associated with the P2P content request, and wherein the P2P content caching information system does not download content from P2P participants;
        in response to receiving each of the plurality P2P content requests, analyze at least one seed file associated with the P2P content request, the at least one seed file comprising index information identifying one or more providers of a given set of P2P contents associated with the P2P content request, wherein the at least one seed file is obtained from the seed server associated with the P2P content request and is also transmitted to the P2P participant in the plurality of P2P participants associated with the P2P content request by the seed server, where the seed server is separate and distinct from the P2P caching system;
        identify, based on the analyzing, a set of set of P2P contents to be cached, the set of P2P contents being sharable between P2P participants, wherein the set of P2P contents is identified based on at least a request frequency of the set of P2P contents, the request frequency indicating a number times the set of P2P contents has been requested for downloading by a P2P participant; and
    a content manager to
        download the set of set of P2P contents into a local memory based on identifying the set of P2P contents,
        request a directory server of the P2P application to register the P2P content caching system as a P2P content provider of the downloaded set of set of P2P contents, and
        provide the downloaded set of set of P2P contents to a P2P participant based on a request from the P2P participant to download the set of set of P2P contents.

2. The P2P content caching system of claim 1, wherein the content analyzer is further to
    identify, based on analyzing the seed file, a number of times the set of P2P contents have been requested within a given period of time as indicated by the seed file.

3. The P2P content caching system of claim 2, wherein the content manager is further to
    identify a demand for the set of P2P contents according to the number of times the set of P2P contents have been requested during the given period of time, and
    rank the set of P2P contents based on the demand.

4. The P2P content caching system of claim 3, wherein the content manager is further to
    determine that the set of P2P contents is in less demand than another set of P2P contents stored in the local memory based on the rank associated with the set of P2P contents and a rank associated with the another set of P2P contents,
    delete the set of P2P contents from the local memory based on the set of P2P contents being in less demand than the another set of P2P contents, and
    update registration information within the directory server to remove the P2P content caching system as a provider of the set of P2P contents that has been deleted.

5. The P2P content caching system of claim 4, wherein the content manager is further to determine that the set of P2P contents is in less demand based on an available capacity of the local memory exceeding a predetermined threshold.

6. The P2P content caching system of claim 4, wherein the content manager is further to delete the set of P2P contents based on an available capacity of the local memory being less than a size of the another set of P2P contents and the demand of the another set of P2P contents being higher than that of the set of P2P contents.

7. The P2P content caching system of claim 1, wherein the content manager is further to request the directory server of the P2P application to register the P2P content caching system to be a high performance P2P content provider based on downloading the determined set of P2P contents to the local memory.

8. A method, by a computer network device, for caching Peer-to-Peer (P2P) content of a P2P application, the method comprising:
    receiving, from at least one router of an area network of the computer network device, at least one P2P content request issued by at least one P2P participant, wherein the at least one P2P content request is received prior to caching of P2P content associated with the at least one P2P content request by the computer network device, wherein the at least one P2P content request is also received by a seed server associated with the P2P content request, and wherein the computer network device does not download content from P2P participants;

in response to receiving the at least one P2P content request, analyzing at least one of a set of seed files and a set of log files, the set of seed files comprising index information identifying one or more providers of a given set of P2P contents and the set of log files comprising histories of different user requests for one or more sets of P2P contents, wherein the set of seed files is received from one or more seed servers and the set of log files is accessed at the one or more seed servers, where the seed server is separate and distinct from the computer network device;

identifying, based on the analyzing, a set of P2P contents to be cached, the set of P2P contents being sharable between P2P participants, wherein the set of P2P contents is identified based on at least a request frequency of the set of P2P contents, the request frequency indicating a number times the set of P2P contents has been requested for downloading by a P2P participant;

downloading, with the computer network device, the set of P2P contents to a local memory;

electronically transmitting a request to a directory server of the P2P application requesting the directory server to register the computer network device as a P2P content provider of the downloaded set of P2P contents; and electronically transmitting the downloaded set of P2P contents to a P2P participant based on a request from the P2P participant to download the set of P2P contents.

9. The method of claim 8, wherein identifying the set of P2P contents is based on the P2P content request.

10. The method of claim 9, wherein identifying the set of P2P contents based on the P2P content request comprises:
identifying, based on analyzing the seed file, a number of times the set of P2P contents have been requested within a given period of time as indicated by the seed file.

11. The method of claim 8, wherein identifying the set of P2P contents for the P2P application on the computer network device comprises:
identifying the set of P2P contents according to a number of times the set of P2P contents have been downloaded within a given period of time based on analyzing the log file.

12. The method of claim 10, further comprising:
identifying a demand for the of P2P contents according to the number of times the set of P2P contents have been requested during the given period of time; and
ranking the set of P2P contents based on the demand.

13. The method of claim 11, further comprising:
identifying a demand for the of P2P contents according to the number of times the set of P2P contents have been requested during the given period of time; and
ranking the set of P2P contents based on the demand.

14. The method of claim 12, further comprising:
determining that the set of P2P contents is in less demand than another set of P2P contents stored in the local memory based on the rank associated with the set of P2P contents and a rank associated with the another set of P2P contents;
deleting the set of P2P contents from the local memory based on the set of P2P contents being in less demand than the another set of P2P contents; and
updating registration information within the directory server to remove the computer network device as a provider of the set of P2P contents that has been deleted.

15. The method of claim 14, wherein deleting the set of P2P contents with less demand in the local memory comprises:
determining that the set of P2P contents is in less demand based on an available capacity of the local memory exceeding a predetermined threshold.

16. The method of claim 14, wherein deleting the P2P contents with less demand in the local memory comprises:
deleting the set of P2P contents based on an available capacity of the local memory being less than a size of the another set of P2P contents and the demand of the another set of P2P contents being higher than that of the set of P2P contents.

17. The method of claim 8, wherein requesting a directory server of the P2P application to register the computer network device as a P2P content provider of the downloaded set of P2P contents comprises:
requesting the directory server of the P2P application to register the computer network device to be a high performance P2P content provider based on downloading the determined set of P2P contents to the local memory.

18. A non-transitory computer program storage product for caching Peer-to-Peer (P2P) content on a computer network device, the computer program product comprising computer program instructions configured to perform a method on the computer network device, the method comprising:

receiving, from at least one router of an area network of the computer network device, at least one P2P content request issued by at least one P2P participant, wherein the at least one P2P content request is received prior to caching of P2P content associated with the at least one P2P content request by the computer network device, wherein the at least one P2P content request is also received by a seed server associated with the P2P content request, and wherein the computer network device does not download content from P2P participants;

in response to receiving the at least one P2P content request, analyzing at least one of a set of seed files and a set of log files, the set of seed files comprising index information identifying one or more providers of a given set of P2P contents and the set of log files comprising histories of different user requests for one or more sets of P2P contents, wherein the set of seed files are received from one or more seed servers and the set of log files being accessed at the one or more seed servers, where the seed server is separate and distinct from the computer network device;

identifying, based on the analyzing, a set of P2P contents to be cached, the set of P2P contents being sharable between P2P participants, wherein the set of P2P contents is identified based on at least a request frequency of the set of P2P contents, the request frequency indicating a number times the set of P2P contents has been requested for downloading by a P2P participant;

downloading, with the computer network device, the set of P2P contents to a local memory;

requesting a directory server of the P2P application to register the computer network device as a P2P content provider of the downloaded set of P2P contents; and providing the downloaded set of P2P contents to a P2P participant, based on a request from the P2P participant to download the set of P2P contents.

\* \* \* \* \*